(12) United States Patent
He et al.

(10) Patent No.: US 9,677,703 B2
(45) Date of Patent: Jun. 13, 2017

(54) FOLDABLE ELECTRIC FAN

(71) Applicants: Xiangming He, Jiangmen (CN);
Guanglian Lin, Jiangmen (CN)

(72) Inventors: Xiangming He, Jiangmen (CN);
Guanglian Lin, Jiangmen (CN)

( * ) Notice: Subject to any disclaimer, the term of this patent is extended or adjusted under 35 U.S.C. 154(b) by 0 days.

(21) Appl. No.: 14/809,333

(22) Filed: Jul. 27, 2015

(65) Prior Publication Data
US 2016/0327201 A1 Nov. 10, 2016

(30) Foreign Application Priority Data

May 4, 2015 (CN) .................... 2015 2 0282341 U

(51) Int. Cl.
| | |
|---|---|
| *F16M 11/38* | (2006.01) |
| *F04D 25/08* | (2006.01) |
| *F16M 7/00* | (2006.01) |
| *F16M 11/32* | (2006.01) |
| *F04D 29/62* | (2006.01) |
| *F04D 25/06* | (2006.01) |
| *F04D 29/64* | (2006.01) |

(52) U.S. Cl.
CPC ......... *F16M 11/38* (2013.01); *F04D 25/0606* (2013.01); *F04D 25/08* (2013.01); *F04D 29/626* (2013.01); *F04D 29/646* (2013.01); *F16M 7/00* (2013.01); *F16M 11/32* (2013.01)

(58) Field of Classification Search
CPC .... F04D 29/626; F04D 29/646; F04D 19/002; F16M 7/00; F16M 11/32; F16M 11/38
USPC ......... 248/165, 166, 167, 170, 436; 416/142
See application file for complete search history.

(56) References Cited

U.S. PATENT DOCUMENTS

| | | | | | |
|---|---|---|---|---|---|
| 2,643,081 | A | * | 6/1953 | Spring ............... | B65D 19/0093 108/54.1 |
| 3,173,642 | A | * | 3/1965 | Greenspan ............... | G10G 5/00 248/170 |
| 3,222,019 | A | * | 12/1965 | Weisberg .................. | A47F 5/00 248/100 |
| 4,927,120 | A | * | 5/1990 | Wang ...................... | F04D 25/08 248/125.1 |
| 5,411,373 | A | | 5/1995 | Chiu et al. | |
| 7,669,815 | B2 | * | 3/2010 | Clewett .................. | E01F 9/692 248/163.1 |

(Continued)

*Primary Examiner* — Eret McNichols
(74) *Attorney, Agent, or Firm* — Schmeiser, Olsen & Watts, LLP

(57) ABSTRACT

A foldable electric fan, including a pressing-down part, a limiting base and a sliding pressing plate for restriction is provided. By pushing one end of the sliding pressing plate for restriction to extend and penetrate through the locking-through channel, the pressing plate for restriction is on top of the movable front supporting base, the fixed supporting base and the movable rear supporting base at the same time. Then when the pressing-down part is exerting pressure on the sliding pressing plate for restriction, the pressing plate for restriction is able to press on the movable front supporting base, the fixed left and right supporting base and the movable rear supporting base at the same time in order to enable the sliding pressing plate for restriction to press tightly on the base, which is easy for operation, simple in structure and not easy to produce scattered components. At the same time, the turnover mechanism further reduces the occupied space of the foldable electric fan.

9 Claims, 19 Drawing Sheets

(56) References Cited

U.S. PATENT DOCUMENTS

| | | | |
|---|---|---|---|
| 7,735,789 B2* | 6/2010 | Blankenship | A61G 12/008 248/129 |
| 8,567,730 B1* | 10/2013 | Stevenson | A61M 5/1415 248/125.8 |
| 8,734,109 B2 | 5/2014 | He et al. | |
| 8,997,662 B2* | 4/2015 | Heyring | A47B 13/02 108/115 |
| 2003/0059307 A1 | 3/2003 | Moreno et al. | |
| 2013/0004330 A1 | 1/2013 | He et al. | |
| 2014/0238747 A1* | 8/2014 | Fabian | F16M 11/00 175/57 |
| 2016/0208807 A1* | 7/2016 | He | F04D 25/105 |

* cited by examiner

FOLDABLE ELECTRIC FAN

CROSS REFERENCE TO RELATED APPLICATION

This application claims priority to Chinese Application No. 201520282341.2 having a filing date of May 4, 2015, the entire contents of which are hereby incorporated by reference.

TECHNICAL FIELD

The present invention relates to the field of electrical fan equipment, in particular to a foldable electric fan.

BACKGROUND

A regular floor fan, as shown in FIG. 1, generally comprises a fan head x1, a support shank x2 used for adjusting the upright height of the fan head, and a base x3, which sequentially connected with each other. However, the adjustable range of height of the fan head x1 is restricted, because the retractable length of the support shank x2 is limited, such an electric fan can be arranged into a floor fan only, and cannot be arranged in to a desk fan. Moreover, the fan head x1, the support shank x2 and the base x3 need to be detached during package and transportation, and the user has to reassemble them together before using. The process of detachment is time-consuming, and the operation is complicated. A risk of losing some tiny parts may also exist. Further, influenced by the size of the base which is usually a regular disc-like base and the length of the support shank, the electric fan after detachment also occupies a large space even if it can be detached into several parts and packed up separately, which greatly increase the cost of package and transportation. Besides, the user has to reassemble the floor fan every time when using it, which requires using extra tools. This is inconvenient for immediate usage of the fan while increasing the operation burden of the users.

Aiming at overcoming the shortcomings in the above-mentioned floor fan, the invention with U.S. Pat. No. 8,734,109 disclosed a foldable electric fan, which enables the folding and storage of the fan by adding a turnover mechanism in it and enables the folding of the fan base by a transforming the structure of the base. This invention has overcome the shortcomings mentioned above by enabling the folding and storage of the floor fan.

Specifically, referring to FIGS. 2-10, the said foldable electric fan comprises a fan head X1, a turnover mechanism X4 that is used to turn the fan head up and down, a support tube X2 and a base X3. The support tube X2 comprises two erect tubes X21 and two height adjusting tubes X22 which engaging with the two elect tubes X21 respectively. The turnover mechanism X4 comprises a connecting block X41 connected on the top of the two height-adjusting tubes X22, an automatic position-limit and locking mechanism X42 for limiting and locking the connecting block X41 on the support tube X2, and a fan head joining tube X43 connected on the middle part of the top of the connecting block. The both sides of the connecting block X41 are movably hanged to the two height-adjusting tubes X22 through axes (X411 and X412); the said automatic position-limit and locking mechanism X42 is arranged in the hanging position of the connecting block X41 and one of the height-adjusting tubes X22. Referring to FIG. 5, the automatic position-limit and locking mechanism X42 is able to tightly lock the connecting block X41 by a spring bolt X421 arranged on the top of one side of the connecting block X41 and a locating hole 42 on the top of one of the height-adjusting tube. Or, referring to FIG. 6, the automatic position-limit and locking mechanism X42 is able to lock the connecting block X41 by a pawl ratchet assembly X'421 installed between the end of the connecting block X41 and one of the height-adjusting tube. The said fan head joining tube X43 is connected to the said fan head X1 on the top.

Referring to FIG. 4 and FIG. 7, the structures enabling the folding of the base X3 include a stationary base X31, a vertical moveable base X32 and a horizontal moveable base X33. The vertical moveable base X32 is articulated with the stationary base 31 by a first door hinge and thus can be turned upward to be folded and restored. The horizontal moveable base X33 is articulated with the middle part of the stationary base X31 by a vertical second door hinge and can be horizontally folded toward one side of the stationary base X31. Meanwhile, referring to FIG. 4 and FIG. 8, in order to ensure the supporting stability of the base X3 in normal use, by the locking bolts (X7 & X8) arranged on the stationary base X31 respectively working with the locking hole X9, the vertical moveable base X32 and the horizontal moveable base X33 can be locked tightly on the stationary base X31. Or referring to FIG. 9 or FIG. 10, the base X'3 can be folded in another way: the base X'3 comprises a stationary base X'31 and a rotatable base X'32. The rotatable base X'32 is in detachable joint with the stationary base X31 by a lock nut X'7, a fastening bolt X'8 and a lock screw X'9 (as referred in FIG. 9) or just by the screw X"7 (as referred in FIG. 10).

Although the structure of the above foldable electric fan has overcome the shortcomings of the floor fan, however, certain defects remain in the said foldable electric fan:

1) The upward and downward turnover of the fan head X1 is enabled by the turnover mechanism X4 through the vertical rotation of connecting block X41, the two sides of which are movably articulated with the top of two height-adjusting tubes X22, around the axis between the top of two height-adjusting tubes X22, and the said connecting block X41 is in flat bar shape, and tend to be influenced by the weight of the fan head X1 which will lead to deformation when the force is too strong. Beside, the turnover flexibility of the turnover mechanism X4 will be decreased because the two sides of the connecting block X41 tend to be influenced by the force exerted by the fan head X1, and thus reduces the working life of the turnover mechanism X4;

2) The locking and locating to the turnover mechanism X4 depends on the automatic position-limit and locking mechanism X42 arranged at the articulating position of the one side of the connecting block X41 and the corresponding height-adjusting tubes, therefore, either the automatic position-limit and locking mechanism X42 of the spring bolt X421 structure or the automatic position-limit and locking mechanism X42 of pawl ratchet assembly X'421 structure, is enabling the locking and locating the turnover mechanism X4 through one direction, which may lead to the instability of the turnover mechanism X4 and increase the burden of the automatic position-limit and locking mechanism X42.

3) It can be known from the structure of the base that it has two embodiments: dividing into two part (stationary base X'31 and rotatable base X'32) or dividing into three parts (a stationary base X31, a vertical moveable base X32 and a horizontal moveable base X33) to enable the folding of the base. When the structure of the base is divided into stationary base X'31 and rotatable base X'32, the separation of the stationary base X'31 and rotatable base X'32 requires disassembling a lock nut, a fastening bolt and a lock screw when packing or folding, thus increase the complexity of the operation and the time for folding and produce many scattered components that is easily lost. Meanwhile, when the structure of the base is divided into a stationary base X31, a vertical moveable base X32 and a horizontal moveable base X33, because it requires locking the three locking bolts by hands to enable the locking when the vertical moveable base X32 and horizontal moveable base X33 is in normal use, and because the fulcrum is on the locking bolts, deformation of the moveable base and movement of position of the locking hole may occur during long-term usage, which may provide difficulty of installation in repeated folding and reduce the utility of the fan.

SUMMARY

The present invention aims at overcoming the shortcomings in the prior art and provides an foldable electric fan that by improved turnover mechanism and base, greatly reduces the overall occupied space, the transportation cost and the labor intensity, facilitates the packaging and transportation, effectively simplifies assembling procedures, and greatly enhances the convenience for the users in storage and use with higher safety and practicality.

The present invention employs the following technical solution: a foldable electric fan, comprising a fan head, a turnover mechanism, a supporting pipe group and a base, which are connected in sequence; wherein the base comprises a fixed left and right supporting base that is transversely parallel to the fan head, a movable front supporting base that can be turned up and a movable rear supporting base that can be folded horizontally to one side of the fixed left and right supporting base. The movable front supporting base and the movable rear supporting base are movably hinged to the two opposite sides of the fixed left and right supporting base respectively. Furthermore, the said foldable electric fan also comprises locking mechanism that is used for locking the movable front supporting base and the movable rear supporting base.

The said locking mechanism comprises a sliding pressing plate for restriction, a pressing-down part that is used for locking the sliding pressing plate for restriction, and a limiting base that is used for limiting the sliding position of the sliding pressing plate for restriction. The pressing-down part is arranged on the top face of the fixed left and right supporting base, a locking-through channel communicated with the top face of the fixed left and right supporting base is formed in the bottom of the pressing-down part, and openings in the two sides of the locking-through channel are communicated with the position above the movable front supporting base and the position above the movable rear supporting base respectively. The limiting base is arranged on the top face of the movable front supporting base or the top face of the movable rear supporting base, and a limit-through channel communicated with the top face of the movable front supporting base or the top face of the movable rear supporting base is formed in the bottom of the limiting base. The sliding pressing plate for restriction is arranged in the limit-through channel and can slide along the limit-through channel to extend and penetrate through the locking-through channel.

When the base is folded, the sliding pressing plate for restriction is located in the limit-through channel; when the base is unfolded, the sliding pressing plate for restriction is located in both the limit-through channel and the locking-through channel at the same time, and is locked by the pressing-down part to press on the top face of the movable front supporting base, the top face of the fixed left and right supporting base and the top face of the movable rear supporting base.

The locking mechanism in the above-mentioned technical solution enables the base to be fixed in normal use through the sliding pressing plate for restriction, a pressing-down part and a limiting base. To further elaborate with an example that the limiting base arranged on the top of movable front supporting base, when the movable front supporting base, the movable rear supporting base and the fixed supporting base are unfolded to formed a whole base, by pushing one end of the sliding pressing plate for restriction to extend and penetrate through the locking-through channel, the one end of the sliding pressing plate for restriction is inside the limit-through channel, i.e. on the top of the movable front supporting base, while the other end is exposed out of the locking-through channel and on top of the movable rear supporting base. Then when the pressing-down part is exerting pressure on the sliding pressing plate for restriction, the pressing plate for restriction is able to press on the movable front supporting base, the fixed left and right supporting base and the movable rear supporting base at the same time in order to enable the sliding pressing plate for restriction to press tightly on the base. Based on the above, the locking mechanism for locking the base in the present invention is easy for operation, simple in structure, convenient for use, time and effort saving, and not easy to produce scattered components avoiding the lost of components while greatly enhance the practicability and convenience of the fan and reduce the occupied space for the base. Therefore, the foldable fan of the present invention greatly reduces the overall occupied space, facilitates the packaging and transportation, reduces the transportation cost and the labor intensity, effectively simplifies assembling procedures, and greatly enhances the convenience for the users in storage and use especially with higher practicality.

As a better technical solution, a locating notch for folding and an locating notch for unfolding which are opposite in direction are formed in the two opposite ends of the top face of the limiting base respectively; and a locating pillar for folding and an locating pillar for unfolding are arranged at the two opposite ends of the top face of the sliding pressing plate for restriction respectively. The locating notch for folding and the locating notch for unfolding are in one-to-one correspondence with the locating pillar for folding and the locating pillar for unfolding respectively. When the base is folded, the locating pillar for folding on the sliding pressing plate for restriction abuts against the locating notch for folding, and the locating pillar for unfolding is separated from the locating notch for unfolding. When the base is unfolded, the locating notch for folding in the limiting base faces the locking-through channel, the locating pillar for unfolding on the sliding pressing plate for restriction abuts against the locating notch for unfolding, and the locating pillar for folding is separated from the locating notch for folding. This solution can effectively avoid the loss of the sliding pressing plate for restriction because of sliding from the limiting base and thus avoid producing the scattered components. Meanwhile, when the fan is in normal use, this solution may guarantee the sliding of the sliding pressing plate for restriction will not go off side and enable the movable front supporting base and movable rear supporting base will suffer symmetric and balanced pressure from the sliding pressing plate for restriction when it is exerted with pressure so as to guarantee the stability of the base.

As a better technical solution, the locating notch for folding and the locating notch for unfolding are arc notches, the locating pillar for folding is of a cylindrical structure matched with the locating notch for folding, and the locating pillar for unfolding is of a cylindrical structure matched with the locating notch for unfolding. This solution may enable the locating notch to better match with the locating pillar on the sliding pressing plate for restriction, enhance the tightness of matching, and relieve the collision between the sliding pressing plate for restriction and the limiting base when it is sliding.

In the embodiment, the pressing-down part comprises a locating base and a pressing-down locking screw. The locating base is fixedly arranged at the top face of the fixed left and right supporting base, the locking-through channel is formed in the bottom of the locating base, and an abutting press screw hole communicated with the locking-through channel is formed on the top of the locating base. The pressing-down locking screw is arranged above the locating base, and is in threaded connection with the abutting press screw hole and can extend into the locking-through channel. The simple structure of the pressing-down part further facilitates the convenient operation of the users and avoids producing any scattered component.

In the embodiment, the section structure of the limiting base is in an Π shape, the section structure of the locating base is in an Π shape, and the section structure of the sliding pressing plate for restriction is in an Π shape.

In the embodiment, the supporting pipe group comprises two vertical pipes that are perpendicularly arranged on the top face of the fixed left and right supporting base 41 and are located outside the two opposite sides of the locating base of the pressing-down part respectively; the turnover mechanism comprises a connection pipe that is arranged at the tops of the two vertical pipes, a three-way pipe, a fan head connection pipe whose top is connected to the fan and a locking part that is used for locking the said three-way pipe; the said three-way pipe is provided with two transverse through openings with the collinear axis and a vertical through opening with the axis perpendicular to the axis of the two transverse through openings; the connection pipe is sleeved with the three-way pipe through the two transverse through openings, and the three-way pipe can rotate around the connection pipe; the bottom of the fan head connection pipe is arranged in the vertical through opening; the locking part is arranged on the three-way pipe. By rotating the three-way pipe around the connection pipe, the structure of this turnover mechanism enables the fan head to turn up and down and can avoid deformation of the current connection block X41 due to the effect of the weight of the fan head. Also, the structure of this turnover mechanism is of good flexibility for turnover and able to prolonging the operation life of the turnover mechanism.

In the embodiment, the locking part comprises a locking screw hole and a triangular screw, wherein the locking screw hole penetrates through one side of the pipe wall of the three-way pipe in the axial direction and is communicated with the pipeline of the three-way pipe. The triangular screw is in threaded connection with the locking screw hole and can extend into the three-way pipe to press the connection pipe in an abutting mode. The locking part enables the locking and loosening of the three-way pipe by merely twisting the triangular screw by hand, which is easy for operation. Meanwhile, the pressure it suffered is lower compared with the automotive locating locking mechanism X42 at the current turnover mechanism X4 and enjoys better stability.

As a better technical solution, the turnover mechanism further comprises a turnover limit part which is used for limiting the turnover position of the three-way pipe. The turnover limit part is a screw fastened to the connection pipe. A turnover limit groove communicated with the pipeline of the three-way pipe is formed in the periphery of one end of the three-way pipe, and the head of the screw is exposed in the turnover limit groove. This solution limits the turnover position of the three-way pipe, avoiding the situation where the connection pipe bears non-uniform stress and the fan head is unstable in work due to the fact that the three-way pipe is affected by horizontal force in the turnover process to horizontally slide along the connection pipe, meanwhile limiting the turnover angle of the three-way pipe rotating around the connection pipe, so as to restrict the ultimate top position and ultimate down position of the fan head when turning up and down, avoiding big-range swing of the fan head when turning up and down. It also guarantee the fan head can vertically turns over at the best positions and is convenient for use and folding.

As a better technical solution, the turnover mechanism further comprises an automatic limit part. The automatic limit part is a spring bolt and comprises a bolt base, a limit bolt rod and a compression spring, wherein the bolt base is perpendicularly and fixedly arranged at the other end of the three-way pipe, the limit bolt rod penetrates through a bolt hole of the bolt base, the compression spring is arranged in the bolt hole of the bolt base, and the limit bolt rod is sleeved with the compression spring. A limit hole is formed in the pipe wall of the connection pipe to jointly form a lock with the limit bolt rod. The automatic limit part working together with the locking part lock the position of the three-way pipe in two different directions and positions, so that to further enhance the stability of locking the three-way pipe and further guarantee the stability of the fan head during work.

As a better technical solution, the two opposite sides on one end of the movable front supporting base are both movably hinged to the fixed left and right supporting base through the rotating shafts; the movable rear supporting base is movably hinged to the fixed left and right supporting base through a vertically arranged door hinge structure. The rotating shafts simplifies the hanging structure by enabling the movable front supporting base movably hinged to the fixed left and right supporting base.

BRIEF DESCRIPTION

The present invention will be further described with reference to the accompanying drawings and particular embodiments, wherein.

DETAILED DESCRIPTION

Figure 1:
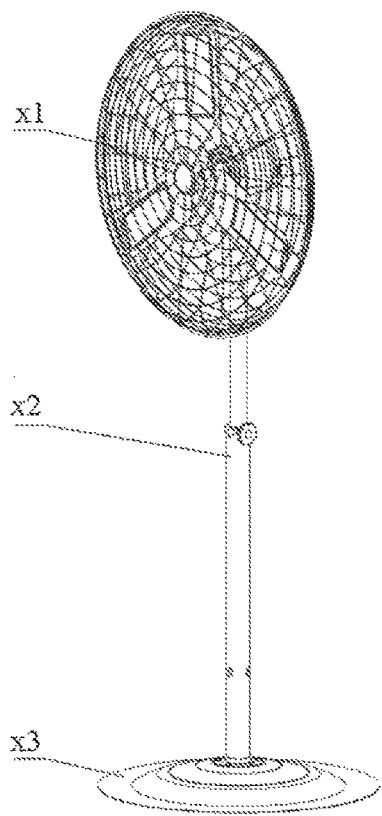
FIG. 1 is a structure diagram of the floor fan in the related art.
Figure 2:
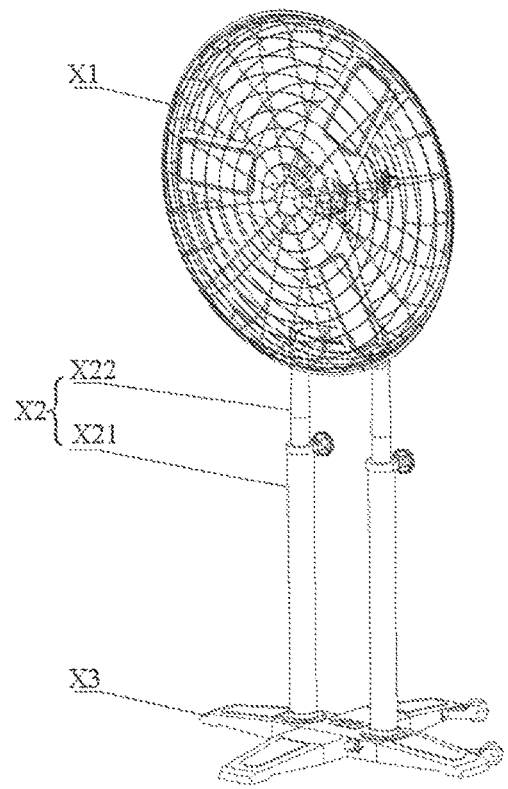
FIG. 2 is a diagram of the foldable electric fan in the related art in normal use.
Figure 3:
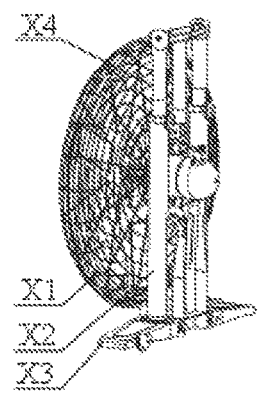
FIG. 3 is a diagram of the folded electric fan shown in FIG. 2.
Figure 4:
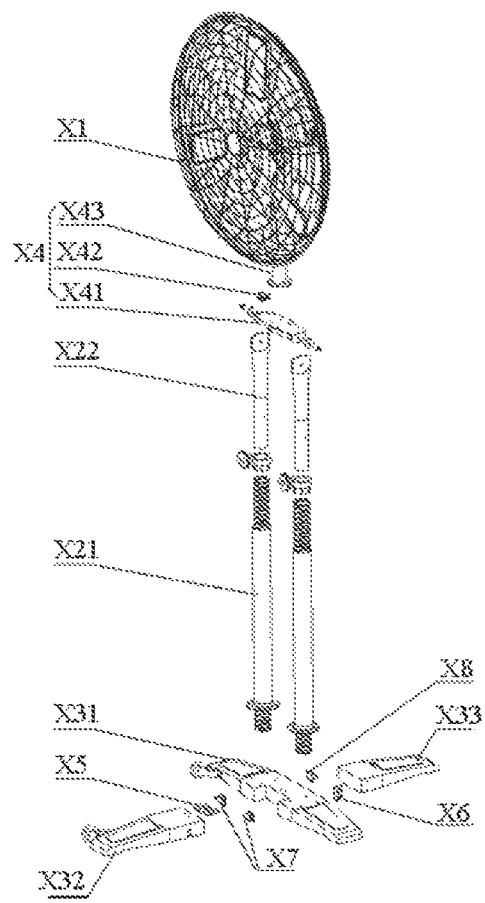
FIG. 4 is an exploded view of the electric fan shown in FIG. 2.
Figure 5:
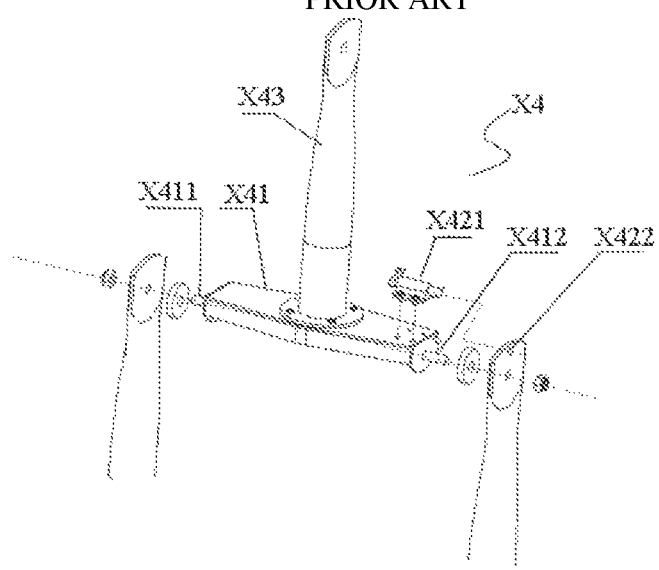
FIG. 5 is a structure diagram of the first embodiment of the turnover mechanism in the electric fan shown in FIG. 3.
Figure 6:
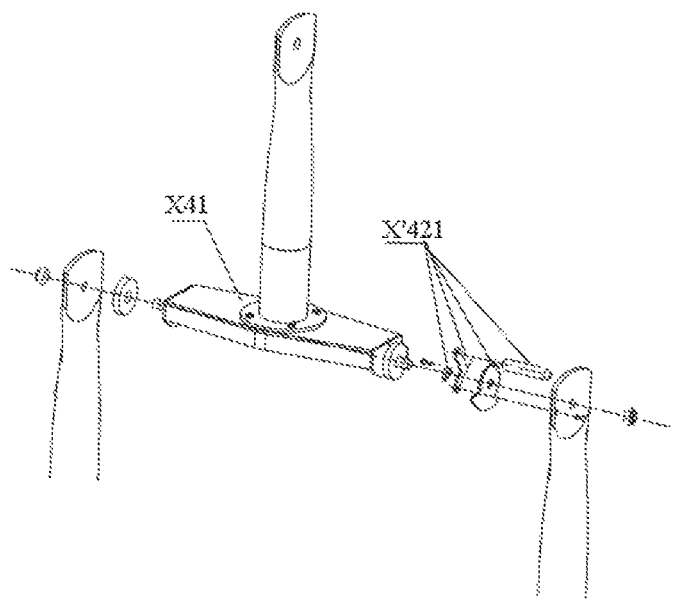
FIG. 6 is a structure diagram of the second embodiment of the turnover mechanism in the electric fan shown in FIG. 3.
Figure 7:
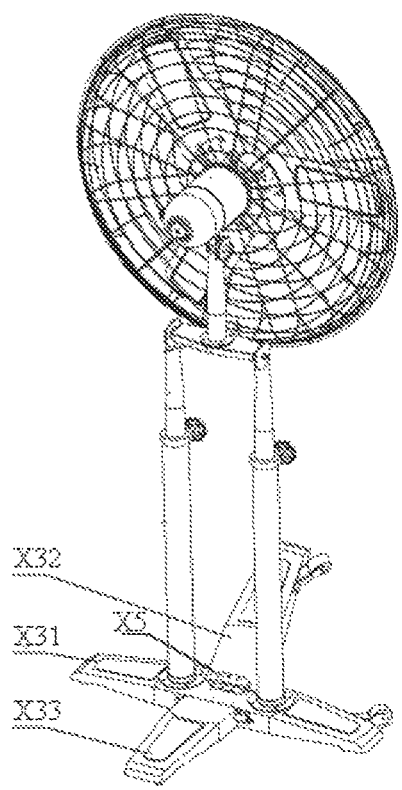
FIG. 7 is a structure diagram of the vertical moveable base of the foldable electric fan in the related art turned upwardly.
Figure 8:
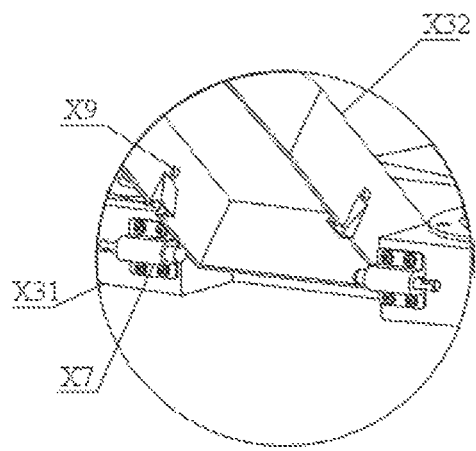
FIG. 8 is a structure diagram of the locking bolts in the vertical moveable base and the locking holes in the stationary base shown in the FIG. 7.
Figure 9:
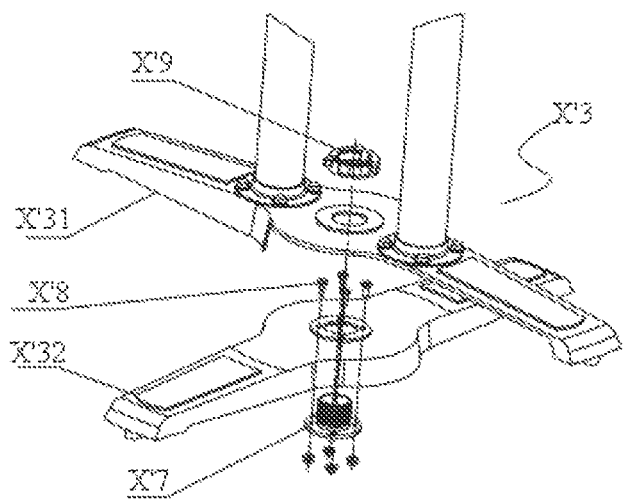
FIG. 9 is a structure diagram of another embodiment of the base of the foldable electric fan in the related art.
Figure 10:
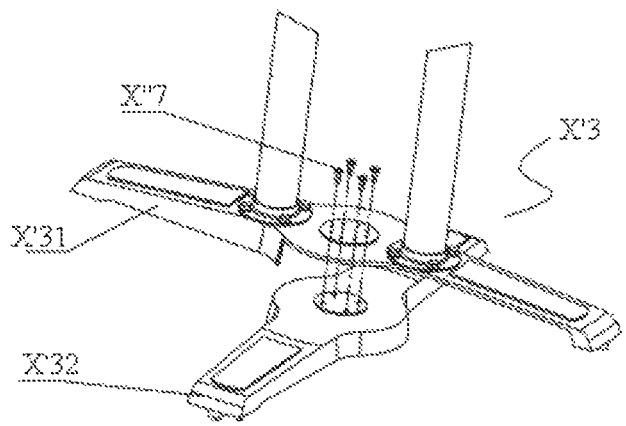
FIG. 10 is a diagram of another connection structure between the stationary base and the rotatable base in the base shown in FIG. 9.
Figure 11:
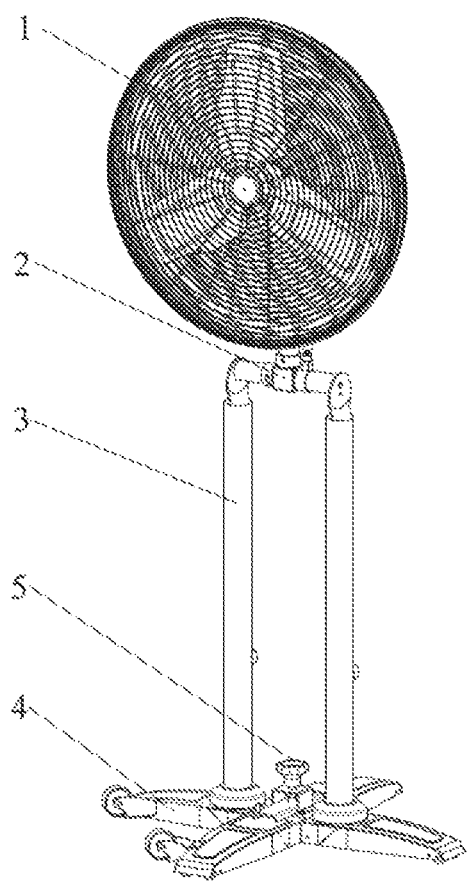
FIG. 11 is a structure diagram of the foldable electric fan of the present invention used as a floor fan.
Figure 12:
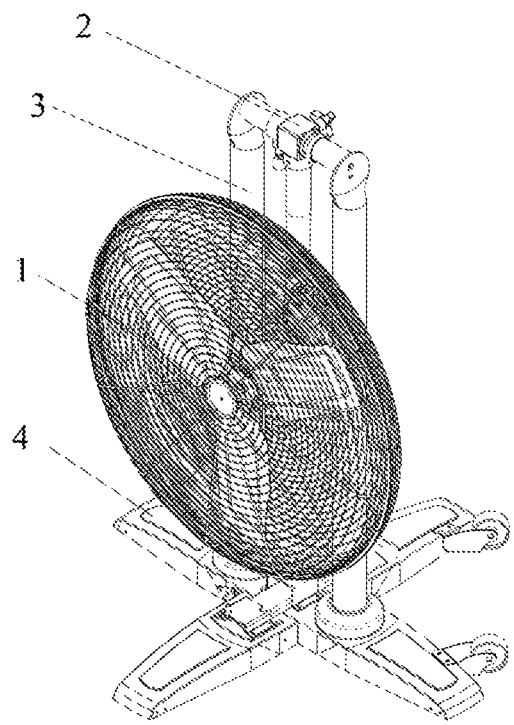
FIG. 12 is a structure diagram of the foldable electric fan of the present invention used as a desk-floor fan.
Figure 13:
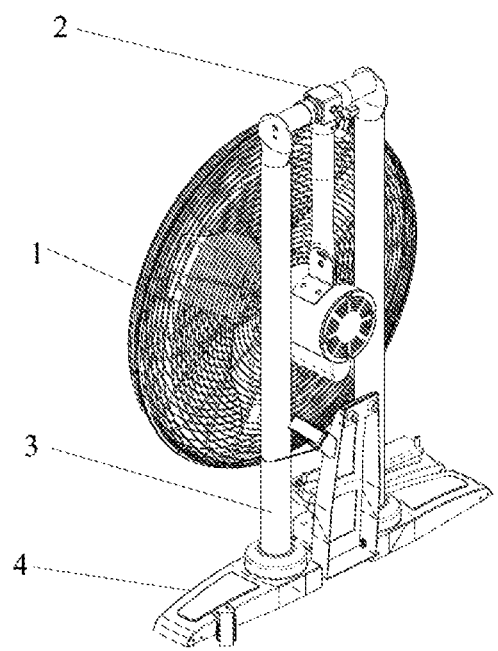
FIG. 13 is a diagram of the foldable electric fan of the present invention in folded status.

Referring to FIGS. 11-13, the embodiment provides a foldable electric fan. The foldable electric fan comprises a fan head 1, a turnover mechanism 2, a supporting pipe group 3, a base 4, and a locking mechanism 5 which are connected in sequence, wherein the locking mechanism 5 is arranged on the base 4.

Referring to FIGS. 14-18, the base 4 comprises a fixed left and right supporting base 41, a movable front supporting base 42 and a movable rear supporting base 43. The fixed left and right supporting base 41 is transversely parallel to the fan head 1. The movable front supporting base 42 and the movable rear supporting base 43 are movably hinged to the two opposite sides of the fixed left and right supporting base 41 respectively. Specifically, an installation groove for hinge joint 411 is formed in the fixed left and right supporting base 41 and located in the position where the fixed left and right supporting base 41 is hinged to the movable front supporting base 42 The end of the movable front supporting base 42 hinged to the fixed left and right supporting base 41 is arranged in the installation groove for hinge joint 411, and the two opposite sides on that end of the movable front supporting base 42 are provided with rotating shafts 421 The two rotating shafts 421 sequentially penetrate through the said two sides of the movable front supporting base 42, holes 41A in the installation groove for hinge joint 411 and nuts 41B outside the installation groove for hinge joint 411, so that the movable front supporting base 42 is movably hinged to the fixed left and right supporting base 41, and the movable front supporting base 42 can be turned up around the two rotating shafts 421 as its axis. The movable rear supporting base 43 is movably hinged to the fixed left and right supporting base 41 through a vertically arranged door hinge structure 431 so as to enable the movable rear supporting base 43 to be folded horizontally to one side of the fixed left and right supporting base 41.

Furthermore, in order to enhance the supporting stability of the base 4 to the fan in normal use, as a better technical solution, the movable front supporting base 42 and the movable rear supporting base 43 are hinged to the middle parts of the two opposite sides of the fixed left and right supporting base 41. And during normal use, the top plan view structure of the base 4 formed by combining the completely unfolded movable front supporting base 42, the completely unfolded movable rear supporting base 43, and the fixed left and right supporting base 41 is in a cross shape.

Furthermore, in order to move the foldable and storable fan conveniently, as a better technical solution, the movable front supporting base 42 and the fixed left and right supporting base 41 are both provided with a roller (42a and 41a).

Figure 21:
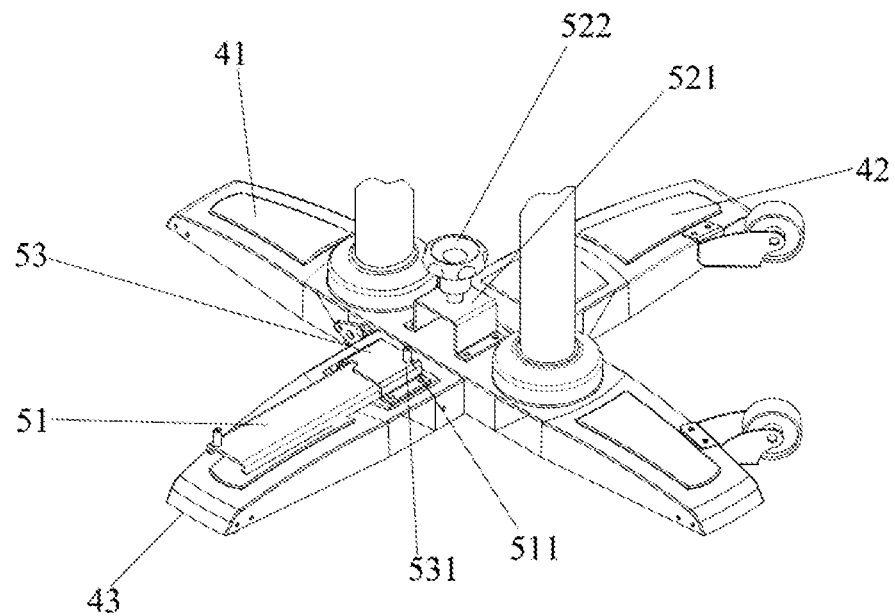
FIG. 21 is a status diagram of the locking mechanism unlocking the base.
Figure 22:
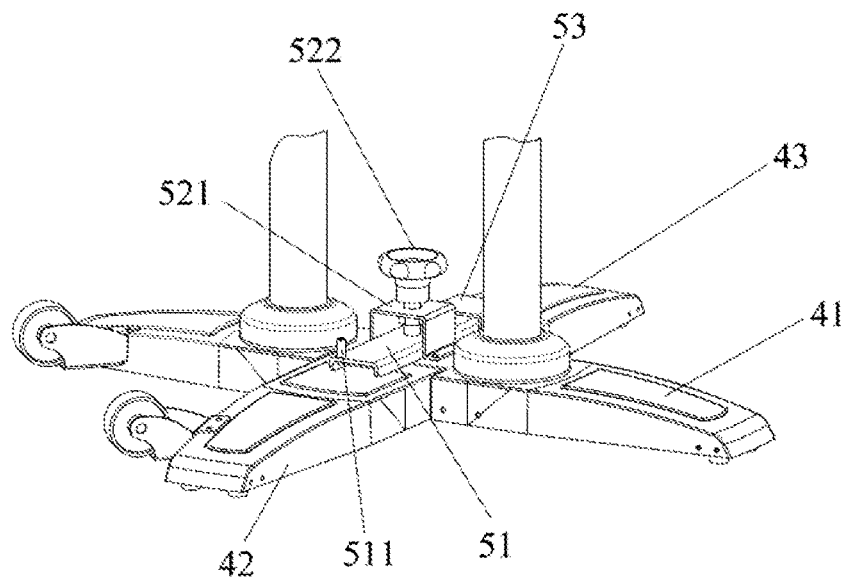
FIG. 22 is a status diagram of the locking mechanism locking the base.
Figure 23:
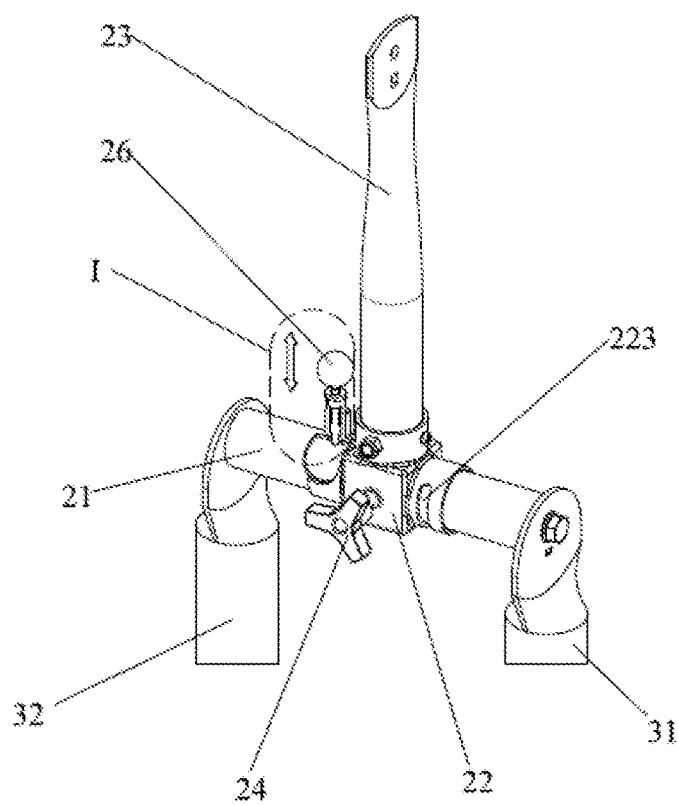
FIG. 23 is a rear perspective view of the turnover mechanism of the present invention.
Figure 24:
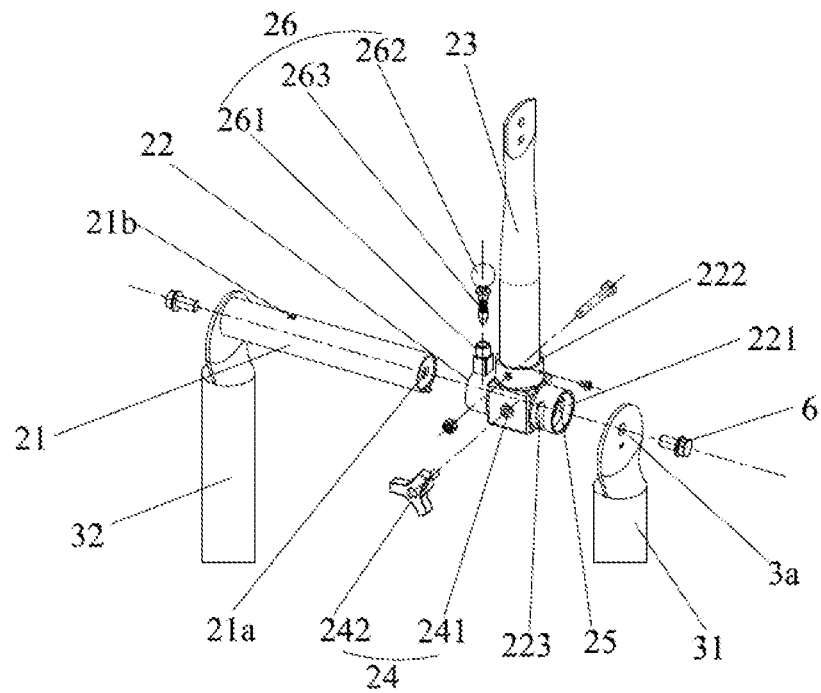
FIG. 24 is an exploded view of the turnover mechanism of the present invention.
Figure 25:
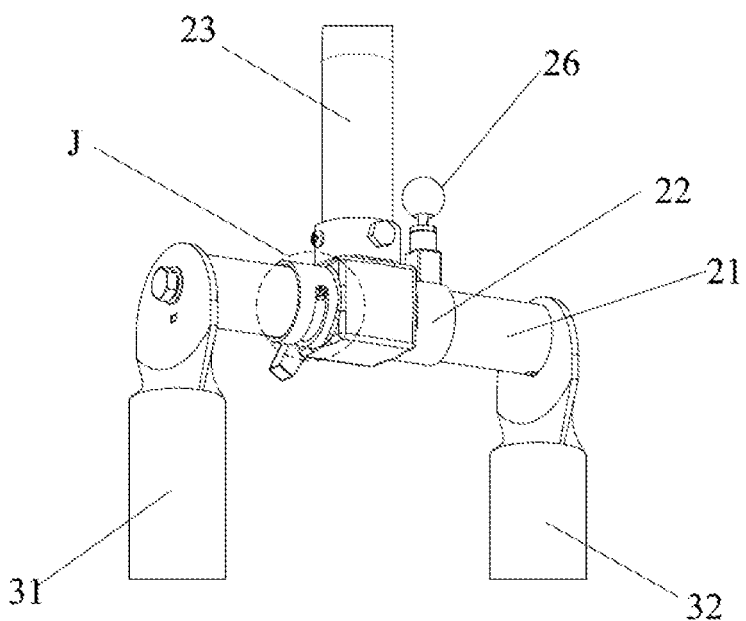
FIG. 25 is a front perspective view of the turnover mechanism of the present invention.
Figure 26:
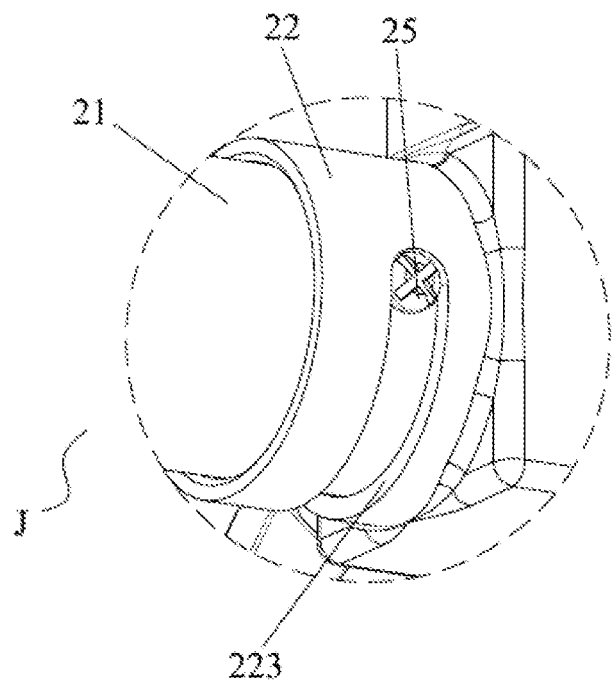
FIG. 26 is an enlarged view of part J shown in FIG. 25.
Figure 27:
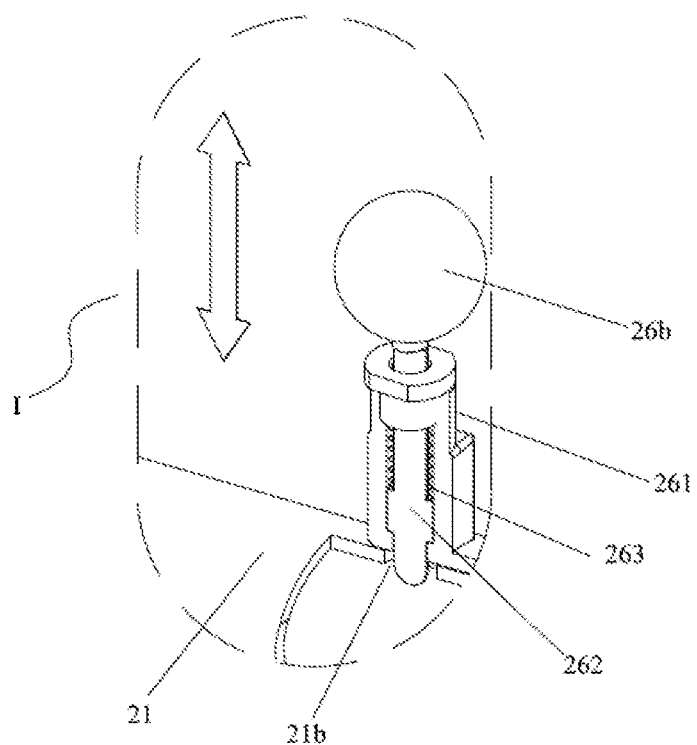
FIG. 27 is an enlarged broken-out section view of part I shown in FIG. 23.
Figure 28:
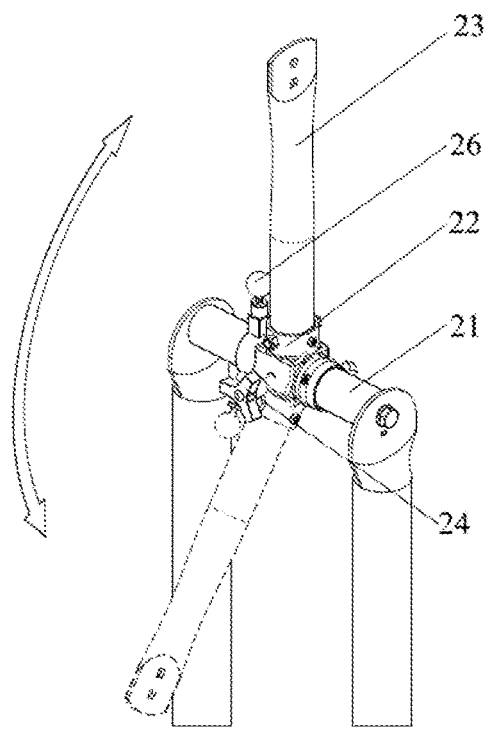
FIG. 28 is a diagram showing the turnover process of the turnover mechanism of the present invention.

Referring to FIG. 14 and FIGS. 19-22, the locking mechanism 5 is used for locking the position of the completely unfolded movable front supporting base 42 and the position of the movable rear supporting base 43 so as to ensure the supporting stability of the base 4. Specifically, the locking mechanism 5 comprises a sliding pressing plate for restriction 51, a pressing-down part 52, and a limiting base 53. The pressing-down part 52 is used for locking the sliding pressing plate for restriction 51 and arranged on the top face of the fixed left and right supporting base 41, a locking-through channel 52A communicated with the top face of the fixed left and right supporting base 41 is formed in the bottom of the pressing-down part, and openings in the two sides of the locking-through channel 52A are communicated with the position above the movable front supporting base 42 and the position above the movable rear supporting base 43 respectively. The limiting base 53 is used for limiting the sliding position of the sliding pressing plate for restriction 51 and arranged on the top face of the movable front supporting base 42 or the top face of the movable rear supporting base 43, and a limit-through channel 53A communicated with the top face of the movable front supporting base 42 or the top face of the movable rear supporting base 43 is formed in the bottom of the limiting base 53. The sliding pressing plate for restriction 51 is arranged in the limit-through channel 53A and can slide along the limit-through channel 53A to extend and penetrate through the locking-through channel 52A. In this embodiment, the limiting base 53 is arranged on the top face of the movable rear supporting base 43, and the limit-through channel 53A is communicated with the top face of the movable rear supporting base 43. When the base 4 is stored, the sliding pressing plate for restriction 51 is located on the top face of the movable rear supporting base 43, one end of the sliding pressing plate for restriction 51 is located in the limit-through channel 53A, and the other end of the sliding pressing plate for restriction 51 is exposed out of the limit-through channel 53A as shown in FIG. 21. When the base 4 is unfolded, one end of the sliding pressing plate for restriction 51 is located in the limit-through channel 53A, the other end of the sliding pressing plate for restriction 51 extends and penetrates through the locking-through channel 52A and is exposed out of the locking-through channel 52A to be located on the top face of the movable front supporting base 42, in other words, at the moment, the sliding pressing plate for restriction 51 is located on the top face of the movable rear supporting base 43, the top face of the fixed left and right supporting base 41 and the top face of the movable front supporting base 42 at the same time, and is locked by the pressing-down part 52 to press on the top face of the movable front supporting base 42, the top face of the fixed left and right supporting base 41 and the top face of the movable rear supporting base 43 in enabling the unfolded base 4 to be locked as shown in FIG. 22.

Furthermore, in order to ensure the balance of the pressure applied by the locking mechanism 5 to the base 4 and further enhance the supporting stability of the base 4, preferably, the pressing-down part 52 is arranged at the middle position of the top face of the fixed left and right supporting base 41, the locking-through channel 52A and the limit-through channel 53A are in the same direction and collinear after the base is unfolded, and the channel width of the locking-through channel 52A is equal to the channel width of the limit-through channel 53A.

Specifically, the pressing-down part 52 comprises a locating base 521 and a pressing-down locking screw 522. The locating base 521 is fixedly arranged at the middle position of the top face of the fixed left and right supporting base 41, the locking-through channel 52A is formed in the bottom of the locating base 521, and an abutting press screw hole 52B communicated with the locking-through channel 52A is formed in the top of the locating base 521. A locking nut 52C collinear with the axis of the abutting press screw hole 52B is fixedly arranged at the end portion of the bottom of the abutting press screw hole 52B. The pressing-down locking screw 522 is arranged above the locating base 521, and is in threaded connection with the abutting press screw hole 52B and the locking nut 52C, and can extend into the locking-through channel 52A.

Furthermore, in order to prevent the sliding pressing plate for restriction 51 from being lost and generating scattered parts due to the fact that the sliding pressing plate for restriction slides out of the limiting base 53, and to ensure the balance of the pressure applied by the sliding pressing plate for restriction 51 to the base 4 and the stability of the base 4, as a better technical solution, a locating notch for folding 531 and an locating notch for unfolding 532 which are opposite in direction are formed in the two opposite ends of the top face of the limiting base 53 respectively; and a locating pillar for folding 511 and an locating pillar for unfolding 512 which are located outside a limiting channel are arranged at the two opposite ends of the top face of the sliding pressing plate for restriction 51 respectively. The locating notch for folding 531 and the locating notch for unfolding 532 are in one-to-one correspondence with the locating pillar for folding 511 and the locating pillar for unfolding 512 respectively. When the base 4 is folded, the locating pillar for folding 511 on the sliding pressing plate for restriction 51 abuts against the locating notch for folding 531, and the locating pillar for unfolding 512 is separated from the locating notch for unfolding 532 so as to prevent the sliding pressing plate for restriction 51 from sliding out of the limit-through channel 53A. When the base 4 is unfolded, the locating notch for folding 531 in the limiting base 53 faces the locking-through channel 52A, the locating pillar for unfolding 512 on the sliding pressing plate for restriction 51 abuts against the locating notch for unfolding 532, and the locating pillar for folding 511 is separated from the locating notch for folding 531.

Furthermore, in order to match the notches of the limiting base 53 with the locating pillars of the sliding pressing plate for restriction 51 better so as to increase the contact compactness and reduce collision, as a better technical solution, the locating notch for folding 531 and the locating notch for unfolding 532 are arc notches, the locating pillar for folding 511 is of a cylindrical structure matched with the locating notch for folding 531, and the locating pillar for unfolding 512 is of a cylindrical structure matched with the locating notch for unfolding 532.

In the embodiment, in order to facilitate manufacture and simplify the structure, the section structure of the limiting base 53 is in a Π shape, the section structure of the locating base 521 is in a Π shape, and the section structure of the sliding pressing plate for restriction 51 is in a Π shape.

Figure 14:
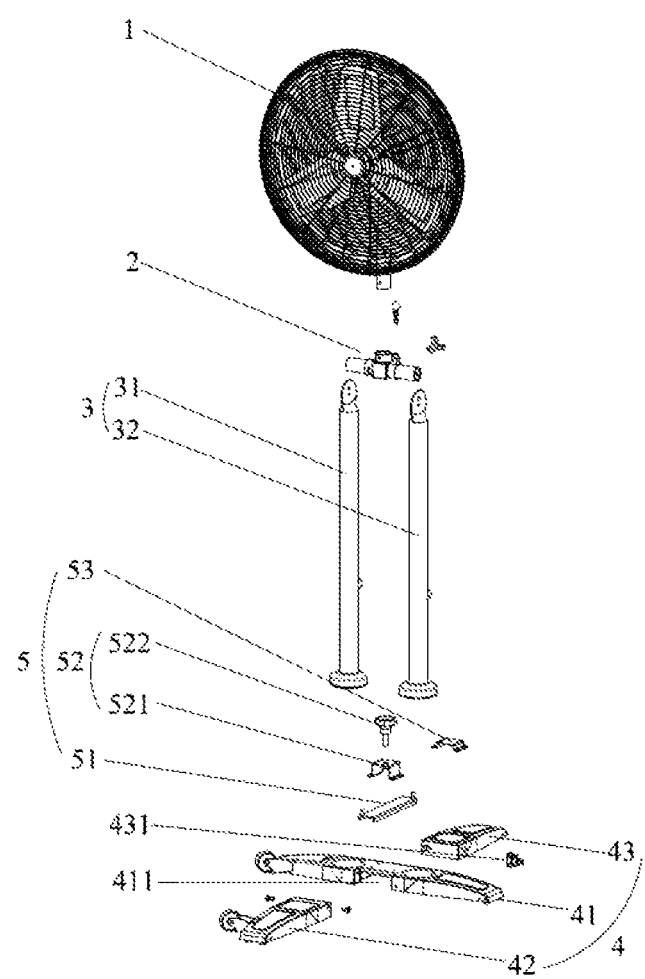
FIG. 14 is an exploded view of the foldable electric fan shown in FIG. 11; 15 is a top plan view of the base in the present invention.
Figure 15:
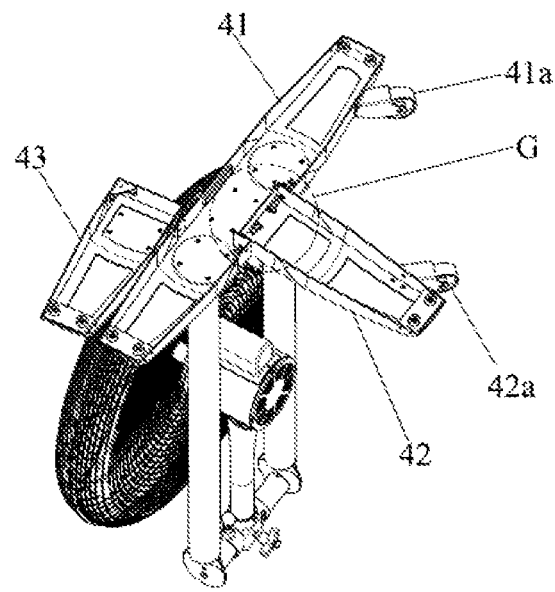
Figure 16:
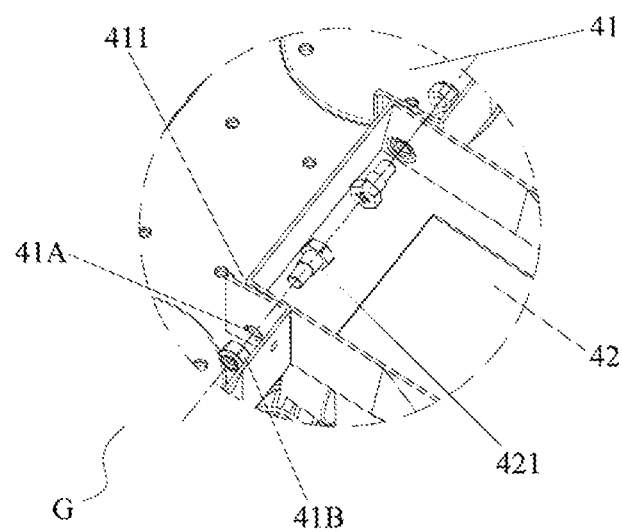
FIG. 16 is an enlarged view of part G shown in FIG. 15.
Figure 17:
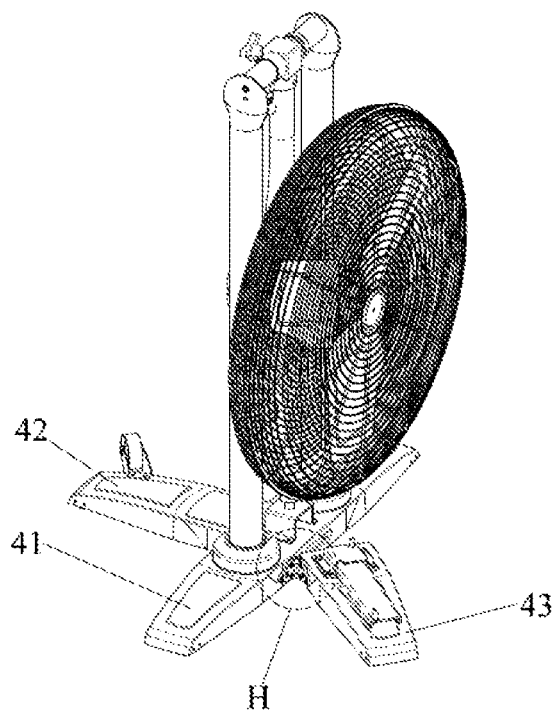
FIG. 17 is a structure diagram of the rotatable base and stationary base of the present invention being separated.
Figure 18:
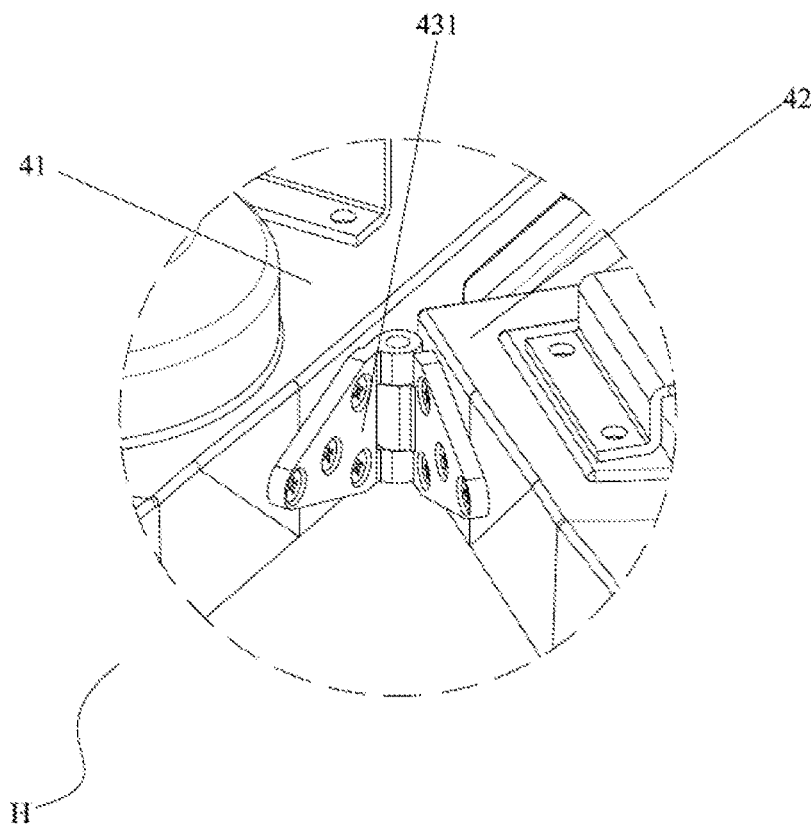
FIG. 18 is an enlarged view of part H shown in FIG. 17.
Figure 19:
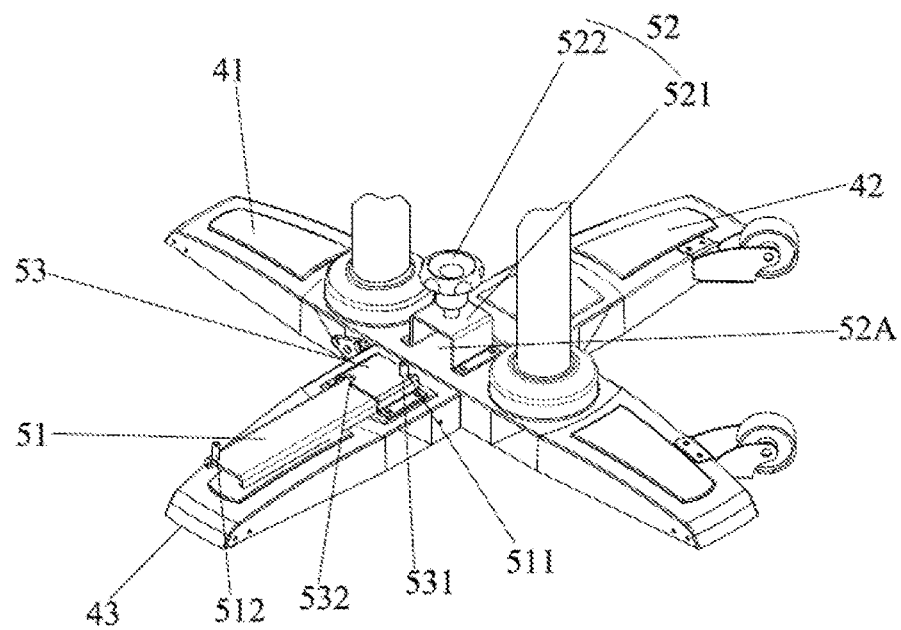
FIG. 19 is a structure diagram of the locking mechanism in the present invention.
Figure 20:
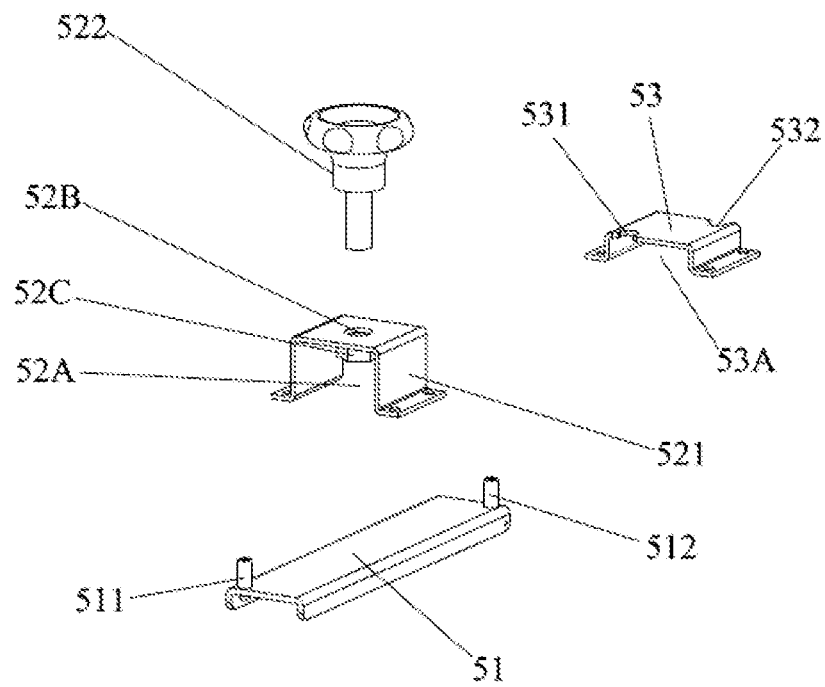
FIG. 20 is an exploded view of the locking mechanism in the present invention.

Referring to the FIG. 14, the supporting pipe group 3 comprises the two vertical pipes (31 and 32), the two vertical pipes (31 and 32) are perpendicularly arranged on the top face of the fixed left and right supporting base 41 and are located outside the two opposite sides of the locating base 521 of the pressing-down part 52 respectively, a straight line perpendicular to the axis of the two vertical pipes (31 and 32) at the same time forms an orthographic projection line on the top face of the left and right supporting base, and the direction of the orthographic projection line is perpendicular to the through direction of the locking-through channel 52A in the locating base 521.

Referring to FIG. 14 and FIGS. 23-28, the turnover mechanism 2 comprises a connection pipe 21, a three-way pipe 22, a fan head connection pipe 23 and a locking part 24. The end portions of the two ends of the connection pipe 21 are each provided with a thread installation hole 21a collinear with the axis of the connection pipe 21, and the tops of the two vertical pipes (31 and 32) are each provided with an installation through hole 3a collinear with the axis of the corresponding thread installation hole 21a, and the thread installation holes 21a in the two ends of the connection pipe 21 are in threaded connection with bolts 6 extending and penetrating through the installation through hole 3a so that the connection pipe 21 can be arranged at the tops of the two vertical pipes (31 and 32). The three-way pipe 22 is provided with two transverse through openings 221 with the collinear axis and a vertical through opening 222 with the axis perpendicular to the axis of the two transverse through openings 221. The two transverse through openings 221 are communicated with the vertical through opening 222 through the three-way pipe 22. The connection pipe 21 is sleeved with the three-way pipe 22 through the two transverse through openings 221, the three-way pipe can rotate around the connection pipe 21, the top of the fan head connection pipe 23 is connected to the fan, and the bottom of the fan head connection pipe 23 is arranged in the vertical through opening 222. The locking part 24 is used for locking the position of the three-way pipe 22 and it is arranged on the three-way pipe 22.

In the embodiment, the locking part 24 comprises a locking screw hole 241 and a triangular screw 242, wherein the locking screw hole penetrates through one side of the pipe wall of the three-way pipe 22 in the axial direction and is communicated with the pipeline of the three-way pipe 22. The triangular screw 242 is in threaded connection with the locking screw hole 241 and can extend into the three-way pipe 22 through screwing operation to press the connection pipe 21 in an abutting mode. In order to better lock the three-way pipe 22 through the triangular screw 242, preferably, the axis of the locking screw hole 241 is perpendicular to the axis of the two transverse through openings 221 and the axis of the vertical through opening 222 at the same time, and its foot of perpendicular on the axis of the two transverse through openings 221 coincides with its foot of perpendicular on the axis of the vertical through opening 222.

Furthermore, in order to avoid the situation where the connection pipe 21 bears non-uniform stress and the fan head 1 is unstable in work due to the fact that the three-way pipe 22 is affected by horizontal force in the turnover process to horizontally slide along the connection pipe 21, and in order to ensure that the fan head 1 vertically turns over at the best positions, as a better technical solution, the turnover mechanism 2 further comprises a turnover limit part which is used for limiting the turnover position of the three-way pipe 22. The turnover limit part is a screw 25 fastened to the connection pipe 21. A turnover limit groove 223 communicated with the pipeline of the three-way pipe 22 is formed in the periphery of one end of the three-way pipe 22, and the head of the screw 25 is exposed in the turnover limit groove 223. In the embodiment, the turning limit groove 223 is of an arc structure, and the groove length of the turnover limit groove is 0.5-0.8 times the circumference of the periphery of the three-way pipe 22.

Furthermore, in order to enhance the locking stability of the three-way pipe 22 and improve the working stability of the fan head 1, as a better technical solution, the turnover mechanism 2 further comprises an automatic limit part 26. The automatic limit part 26 is a spring bolt and comprises a bolt base 261, a limit bolt rod 262 and a compression spring 263, wherein the bolt base is perpendicularly and fixedly arranged at the other end of the three-way pipe 22, the limit bolt rod 262 penetrates through a bolt hole of the bolt base 261, the compression spring 263 is arranged in the bolt hole of the bolt base 261, and the limit bolt rod 262 is sleeved with the compression spring. A limit hole 21b is formed in the pipe wall of the connection pipe 21 to jointly form a lock with the limit bolt rod 262. The top of the limit bolt rod 262 is provided with a lifting portion 26b of a spherical structure so that the bottom of a limit bolt can be conveniently lifted out of the limit hole 21b to unlock the three-way pipe 22. The axis of the limit hole 21b is perpendicular to the axis of the locking screw hole 241, so that the three-way pipe 22 is locked in different directions through the spring bolt and the triangular screw 242.

Figure 29:
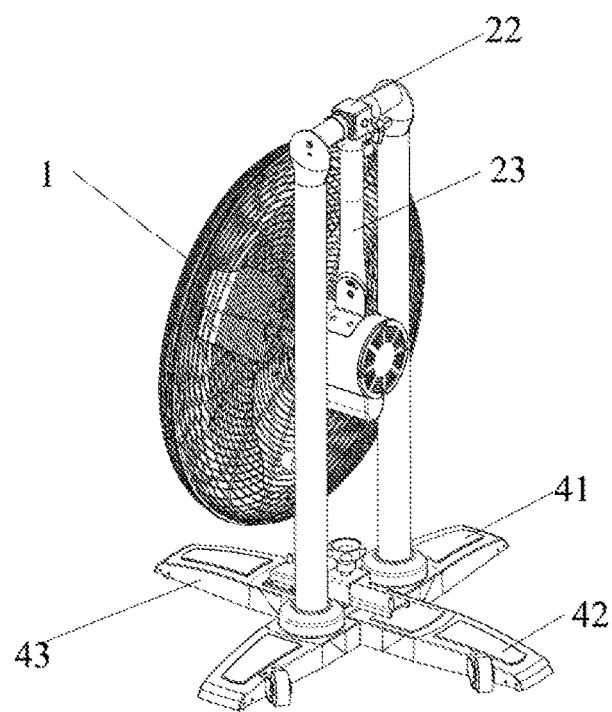
FIG. 29 is a status diagram of the turnover mechanism of the present invention turning the fan head downward.
Figure 30:
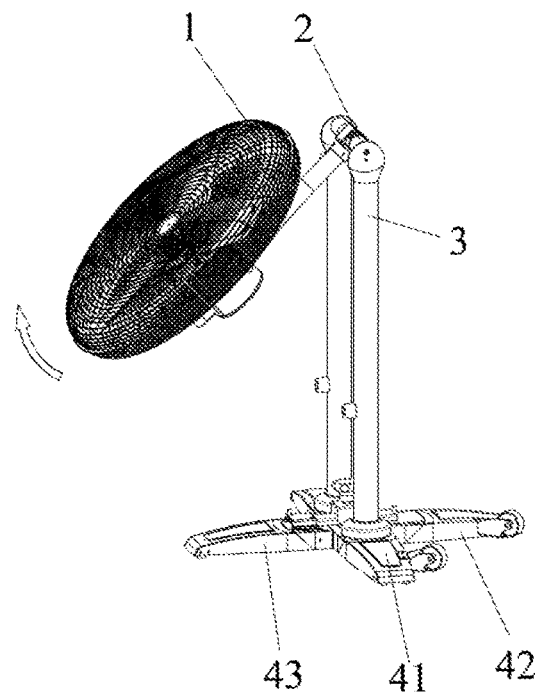
FIG. 30 is a diagram showing the process of the turnover mechanism of the present invention turning the fan head upward.
Figure 31:
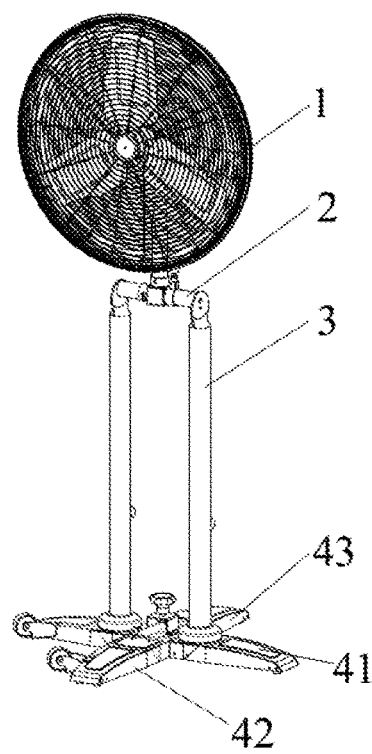
FIG. 31 is a status diagram of the turnover mechanism of the present invention turning the fan head upward.

A use method of the foldable and storable fan comprises the following steps:

Referring to FIG. 29, when the fan head 1 needs to be turned over downwards, first screw the triangle screw 242 in the loosening direction, so that the triangle screw 242 is separated from the connection pipe 21; then lift the limit bolt rod 262 upwards to separate the limit bolt rod 262 from the limit hole 21b in the connection pipe 21, at the moment, the turnover mechanism 2 is in the unlocked state, the fan head 1 can be freely turned over by rotating the three-way pipe 22, and the fan head 1 is folded to one side of the two vertical pipe (31 and 32). Referring to FIG. 30 and FIG. 31, whereas when the fan head 1 is needed to be turned over from the folded state to the vertical fan state, rotates the three-way pipe 22 to enable the fan head 1 to be turned upwards to the vertical position, at this moment, the limit bolt rod 262 is facing right to the limit hole 21b and is affected by the acting force of the compression spring 263 to be automatically popped into the limit hole 21b, and the three-way pipe 22 is locked immediately. And then screws the triangular screw 242 in the screwing direction to make the triangular screw 242 penetrate through the pipeline of the three-way pipe 22 to tightly press the connection pipe 21 in an abutting mode, and the three-way pipe 22 is further locked so that the safety and stability of the foldable and storable fan are improved.

Figure 32:
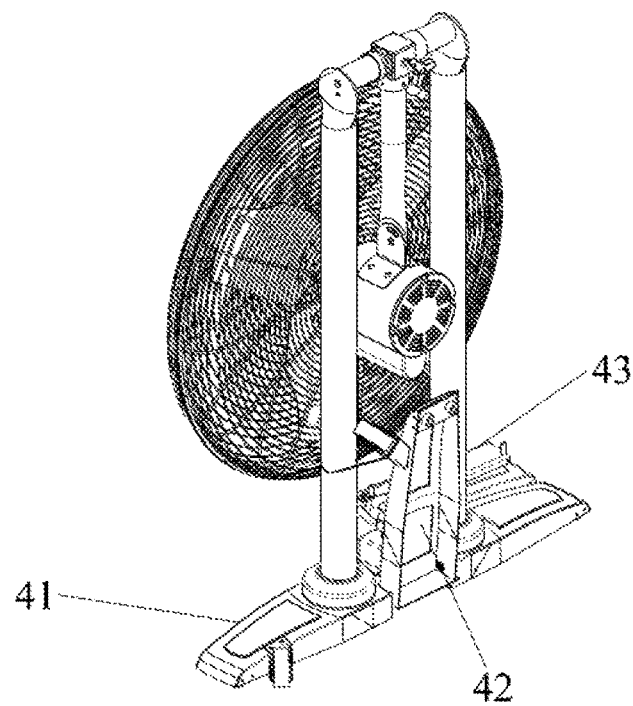
FIG. 32 is a diagram of the base of present invention completely folded.
Figure 33:
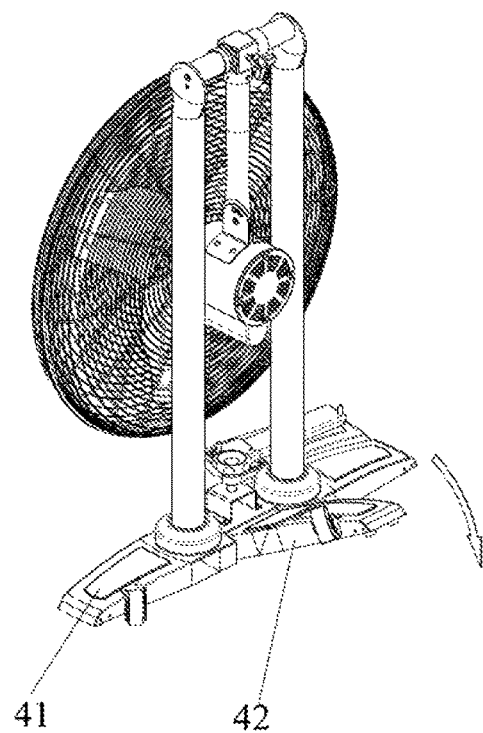
FIG. 33 is a diagram showing the unfolding process of the movable front supporting base.
Figure 34:
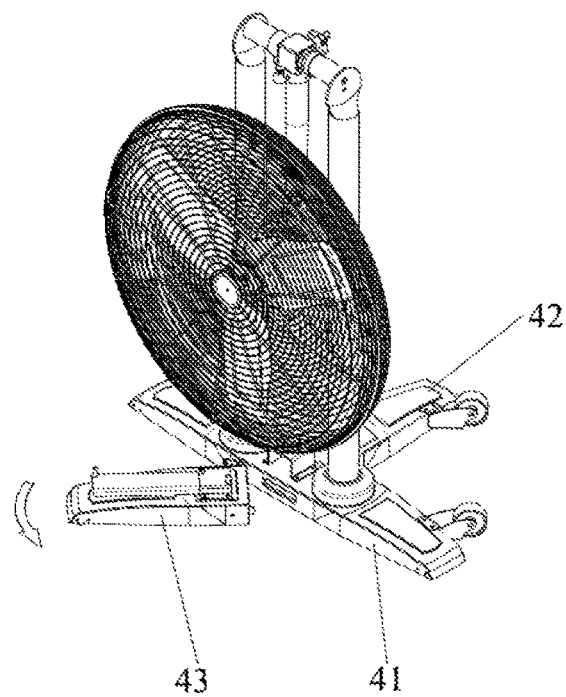
FIG. 34 is a diagram showing the unfolding process of the movable rear supporting base.
Figure 35:
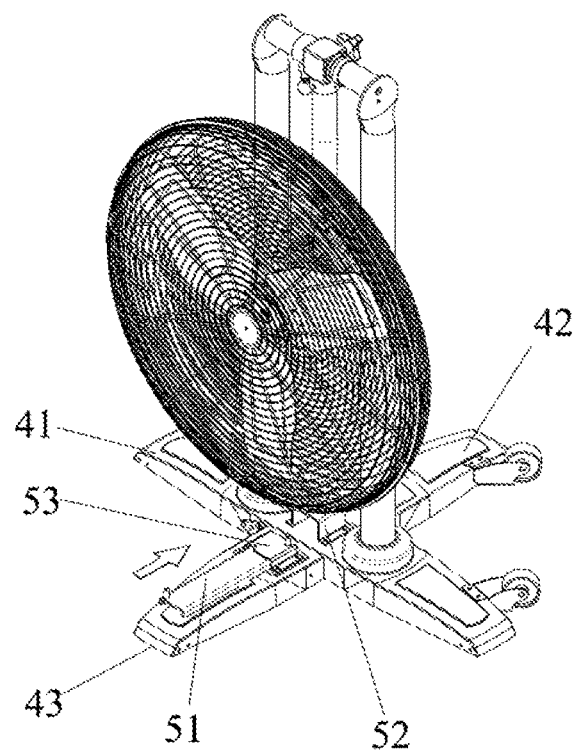
FIG. 35 is a status diagram of sliding pressing plate for restriction in the locking mechanism sliding toward the limit-through channel when the base is unfolded.
Figure 36:
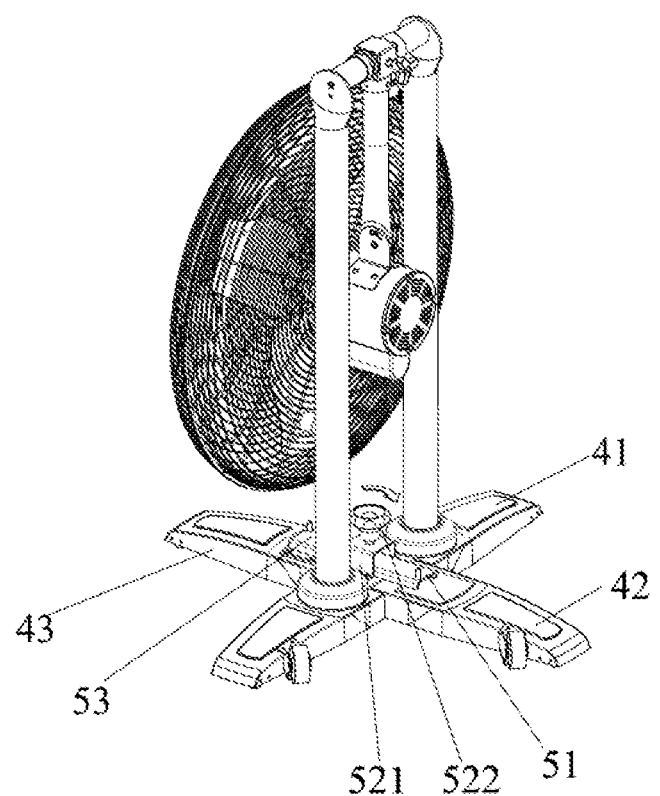
FIG. 36 is a status diagram showing the pressing-down locking screw is twisted to lock the base after the sliding pressing plate for restriction shown in FIG. 35 is in place.

Referring to FIG. 32, when the movable front supporting base 42 and the movable rear supporting base 43 are needed to be stored and folded, screw the pressing-down locking screw 522 of the pressing-down part 52 loose in the loosening direction, so that the end portion of the pressing-down locking screw 522 is separated from the sliding pressing plate for restriction 51 and does not press the sliding pressing plate for restriction 51 in the abutting mode any more. At the moment, the sliding pressing plate for restriction 51 is in the unlocked state, then move it in the direction of the limiting base 53, so that the sliding pressing plate for restriction 51 is separated from the locking-through channel 52A of the locating base 521 in the pressing-down part 52, and the sliding pressing plate for restriction 51 is completely located on the top face of the movable rear supporting base 43. At the moment, the movable front supporting base 42 and the movable rear supporting base 43 can be freely folded. Then, rotate the movable front supporting base 42 around the rotating shafts 421 to turn upwards, and fold the movable rear supporting base 43 to one side of the fixed left and right supporting base 41, therefore the movable front supporting base 42 and the movable rear supporting base 43 are stored and folded. Referring to FIGS. 33-36, when the movable front supporting base 42 and the movable rear supporting base 43 are needed to be turned over from the folded state to the unfolded supporting state, turn the movable front supporting base 42 downwards to the plane where the fixed left and right supporting base 41 is located, and then move the movable rear supporting base in the direction of the fixed left and right supporting base 41, so that the through opening of the limit-through channel 53A in the limiting base 53 arranged on the top face of the movable rear supporting base right faces the through opening of the locking-through channel 52A located in the top face of the fixed left and right supporting base 41. At the moment, push the sliding pressing plate for restriction 51 to enable its end that faces the locking-through channel 52A extends and penetrates through the locking-through channel 52A. When the locating pillar for unfolding 512 of the sliding pressing plate for restriction 51 is in butt joint with the locating notch for unfolding 532 of the limiting base 53, the sliding pressing plate for restriction 51 is located on the top face of the movable rear supporting base 43, the top face of the fixed left and right supporting base 41 and the top face of the movable front supporting base 42 at the same time, and at this moment, the pressing-down locking screw 522 can be screwed in the screwing direction so that the pressing-down locking screw 522 can move downwards to tightly press the sliding pressing plate for restriction 51 in an abutting mode, and the movable rear supporting base 43, the fixed left and right supporting base 41 and the movable front supporting base 42 can be locked.

In addition, other varied embodiments are further provided in this invention, for example:

(1) The supporting pipe group 3 further comprises two height adjusting pipes. The two vertical pipes (31 and 32) are sleeved with the two height adjusting pipes respectively, and the turnover mechanism 2 is arranged at the tops of the two height adjusting pipes.

(2) The section structure of the limit base, section structure of the locating base, and the section structure of the sliding pressing plate for restriction are changed, in other words, the section structure of the limit base, the section structure of the locating base, and the section structure of the sliding pressing plate for restriction are in an "∩" shape; or the section structure of the limit base, the section structure of the locating base and the section structure of the sliding pressing plate for restriction are in a "^" shape; or the section structure of the limit base, the section structure of the locating base, and the section structure of the sliding pressing plate for restriction are in an "H" shape; or the section structure of the limit base, the section structure of the locating base, and the section structure of the sliding pressing plate for restriction are in an "M" shape.

(3) The structure of the locating notch for folding is changed, in other words, the locating notch for folding is a polygonal notch or a circular notch.

(4) The structure of the locating notch for unfolding is changed, in other words, the locating notch for unfolding is a polygonal notch or a circular notch.

(5) The structure of the locating pillar for folding is changed, in other words, the structure of the locating pillar for folding is a prism or a hook strip or a protrusion.

(6) The structure of the locating pillar for unfolding is changed, in other words, the structure of the locating pillar for unfolding is a prism or a hook strip or a protrusion.

Compared with the prior art, the foldable electric fan greatly reduces the overall occupied space, facilitates the packaging and transportation, reduces the transportation cost and the labor intensity, effectively simplifies assembling procedures, and greatly enhances the convenience for the users in storage and use with higher safety and practicality.

The present invention is not limited to the embodiments. If any modifications or variations of the present invention do not depart from the spirit and scope of the invention and belong to what is claimed in the present invention and the scope of equivalent technologies, the present invention also intends to include such modifications and variations.

What is claimed is:

1. A foldable electric fan, comprising:
a fan head, a turnover mechanism, a supporting pipe group and a base, which are connected in sequence; wherein the base comprises a fixed left and right supporting base that is transversely parallel to the fan head, a movable front supporting base that can be turned up and a movable rear supporting base that can be folded horizontally to one side of the fixed left and right supporting base; wherein the movable front supporting base and the movable rear supporting base are movably hinged to two opposite sides of the fixed left and right supporting base respectively; wherein the said foldable electric fan also comprises a locking mechanism that is used for locking the movable front supporting base and the movable rear supporting base; wherein the locking mechanism comprises a sliding pressing plate for restriction, a pressing-down part that is used for locking the sliding pressing plate for restriction, and a limiting base that is used for limiting a sliding position of the sliding pressing plate for restriction; wherein the pressing-down part is arranged on a top face of the fixed left and right supporting base, a locking-through channel communicated with the top face of the fixed left and right supporting base is formed in a bottom of the pressing-down part, and openings in two sides of the locking-through channel are communicated with a position above the movable front supporting base and a position above the movable rear supporting base respectively; wherein the limiting base is arranged on a top face of the movable front supporting base or a top face of the movable rear supporting base, and a limit-through channel communicated with the top face of the movable front supporting base or the top face of the movable rear supporting base is formed in a bottom of the limiting base; wherein the sliding pressing plate for restriction is arranged in the limit-through channel and can slide along the limit-through channel to extend and penetrate through the locking-through channel; wherein when the base is folded, the sliding pressing plate for restriction is located in the limit-through channel; when the base is unfolded, the sliding pressing plate for restriction is located in both the limit-through channel and the locking-through channel at the same time, and is locked by the pressing-down part to press on the top face of the movable front supporting base, the top face of the fixed left and right supporting base and the top face of the movable rear supporting base.

2. The foldable electric fan of claim 1, wherein a locating notch for folding and a locating notch for unfolding which are opposite in direction are formed in two opposite ends of a top face of the limiting base respectively; and a locating pillar for folding and an locating pillar for unfolding are arranged at two opposite ends of the top face of the sliding pressing plate for restriction respectively; wherein the locating notch for folding and the locating notch for unfolding are in one-to-one correspondence with the locating pillar for folding and the locating pillar for unfolding respectively; when the base is folded, the locating pillar for folding on the sliding pressing plate for restriction abuts against the locating notch for folding, and the locating pillar for unfolding is separated from the locating notch for unfolding; when the base is unfolded, the locating notch for folding in the limiting base faces the locking-through channel, the locating pillar for unfolding on the sliding pressing plate for restriction abuts against the locating notch for unfolding, and the locating pillar for folding is separated from the locating notch for folding.

3. The foldable electric fan of claim 2, wherein the locating notch for folding and the locating notch for unfolding are arc notches, the locating pillar for folding is of a cylindrical structure matched with the locating notch for folding, and the locating pillar for unfolding is of a cylindrical structure matched with the locating notch for unfolding.

4. The foldable electric fan of claim 1, wherein the pressing-down part comprises a locating base and a pressing-down locking screw; wherein the locating base is fixedly arranged at the top face of the fixed left and right supporting base, the locking-through channel is formed in a bottom of the locating base, and an abutting press screw hole communicated with the locking-through channel is formed on a top of the locating base; wherein the pressing-down locking screw is arranged above the locating base, and is in threaded connection with the abutting press screw hole and can extend into the locking-through channel.

5. The foldable electric fan of claim 1, wherein the supporting pipe group comprises two vertical pipes that are perpendicularly arranged on the top face of the fixed left and right supporting base and are located outside two opposite sides of the locating base of the pressing-down part respectively; wherein the turnover mechanism comprises a connection pipe that is arranged at tops of the two vertical pipes, a three-way pipe, a fan head connection pipe whose top is connected to the fan and a locking part that is used for locking the three-way pipe; wherein the three-way pipe is provided with two transverse through openings with a collinear axis and a vertical through opening with an axis perpendicular to the collinear axis of the two transverse through openings; wherein the connection pipe is sleeved with the three-way pipe through the two transverse through openings, and the three-way pipe can rotate around the connection pipe, a bottom of the fan head connection pipe is arranged in the vertical through opening, and the locking part is arranged on the three-way pipe.

6. The foldable electric fan of claim 5, wherein the locking part comprises a locking screw hole and a triangular screw; wherein the locking screw hole penetrates through one side of a pipe wall of the three-way pipe in an axial direction and is communicated with a pipeline of the three-way pipe; wherein the triangular screw is in threaded connection with the locking screw hole and can extend into the three-way pipe to press the connection pipe in an abutting mode.

7. The foldable electric fan of claim 5, wherein the turnover mechanism further comprises a turnover limit part which is used for limiting a turnover position of the three-way pipe; wherein the turnover limit part is a screw fastened to the connection pipe; wherein a head of the screw is exposed in a turnover limit groove that is communicated with a pipeline of the three-way pipe formed in a periphery of one end of the three-way pipe.

8. The foldable electric fan of claim 7, wherein the turnover mechanism further comprises an automatic limit part; wherein the automatic limit part is a spring bolt which comprises a bolt base, a limit bolt rod and a compression spring, wherein the bolt base is perpendicularly and fixedly arranged at another end of the three-way pipe, the limit bolt rod penetrates through a bolt hole of the bolt base, the compression spring is arranged in the bolt hole of the bolt base, and the limit bolt rod is sleeved with the compression spring; wherein a limit hole is formed in a pipe wall of the connection pipe to jointly form a lock with the limit bolt rod.

9. The foldable electric fan of claim 1, wherein two opposite sides on one end of the movable front supporting base are both movably hinged to the fixed left and right supporting base through rotating shafts; and the movable rear supporting base is movably hinged to the fixed left and right supporting base through a vertically arranged door hinge structure.

* * * * *